United States Patent
Gebhard (10) Patent No.: US 10,172,143 B2
(45) Date of Patent: Jan. 1, 2019

(54) SECOND ORDER INTERMODULATION CANCELATION FOR RF TRANSCEIVERS

(71) Applicant: Intel Corporation, Santa Clara, CA (US)

(72) Inventor: Andreas Gebhard, Linz (AT)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/425,230

(22) Filed: Feb. 6, 2017

(65) Prior Publication Data

US 2018/0227925 A1   Aug. 9, 2018

(51) Int. Cl.
*H04L 5/14* (2006.01)
*H04B 1/525* (2015.01)
*H04W 72/08* (2009.01)

(52) U.S. Cl.
CPC .......... *H04W 72/082* (2013.01); *H04B 1/525* (2013.01); *H04L 5/143* (2013.01)

(58) Field of Classification Search
CPC . H04B 1/44; H04B 1/525; H04B 1/18; H04B 1/48; H04B 10/697; H04B 3/32; H04B 1/1027; H04B 1/1036; H04B 1/109
See application file for complete search history.

(56) References Cited

U.S. PATENT DOCUMENTS

| | | | | |
|---|---|---|---|---|
| 2003/0174763 A1* | 9/2003 | Kouki | ............... | H04B 1/525 375/219 |
| 2011/0195672 A1* | 8/2011 | Pratt | ............... | H04B 1/525 455/78 |
| 2012/0262217 A1* | 10/2012 | Gorbachov | ............... | H01P 1/15 327/382 |
| 2014/0161159 A1* | 6/2014 | Black | ............... | H04B 15/00 375/219 |
| 2015/0078226 A1* | 3/2015 | Charlon | ............... | H04B 1/525 370/290 |
| 2016/0087823 A1* | 3/2016 | Wang | ............... | H04L 25/0272 375/257 |

FOREIGN PATENT DOCUMENTS

WO   2009156510 A2   12/2009

OTHER PUBLICATIONS

Razavi, Behzad. "Design Considerations for Direct-Conversion Receivers." IEEE Transactions on Circuits and Systems-II: Analog and Digital Signal Processing, vol. 44, No. 6, Jun. 1997. pp. 428-435.

(Continued)

*Primary Examiner* — Sharad Rampuria
(74) *Attorney, Agent, or Firm* — Eschweiler & Potashnik, LLC (57) ABSTRACT

A method includes estimating a transmit leakage signal for a duplexer, where the duplexer is included in a transceiver that includes a transmit chain and a receive chain; squaring an envelope of the estimated transmit leakage signal; generating a replica signal based at least on the squared envelope of the estimated transmit leakage signal; and subtracting the replica signal from a total received signal in the receive chain to generate a wanted received baseband signal.

19 Claims, 4 Drawing Sheets

(56) References Cited

OTHER PUBLICATIONS

Frotzscher, Andreas et al. "Least Squares Estimation for the Digital Compensation of Tx Leakage in zero-IF Receivers." IEEE Communications Society. 2009, 6 pages.
Lederer, Christian et al. "LMS based digital cancellation of second-order TX intermodulation products in homodyne receivers." IEEE, 2011. pp. 207-210.
International Search Report dated May 29, 2018 in connection with International Application PCT/US2018/015417.

* cited by examiner

SECOND ORDER INTERMODULATION CANCELATION FOR RF TRANSCEIVERS

FIELD

The present disclosure relates to the field of wireless transmitters and in particular to methods and apparatus for canceling second order intermodulation error in a receive chain baseband signal.

BACKGROUND

Non-linearities in electronic components in transceivers are a source of distortion and noise. Often the errors and distortion caused by non-linearities are propagated to multiple frequencies and/or increased by other components acting on the signal that includes the error or distortion. The non-linearities in electronic components may be a function of operating conditions. Thus, it can be difficult to compensate for or cancel out the errors and distortion that result from non-linearities across a wide range of operating conditions experienced by a transceiver in normal operation.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Second order intermodulation distortion (IMD2) occurs when a signal passes through a second-order, or quadratic, nonlinearity. The generated IMD2 interference occurs near zero frequency, independent of the signal's frequency. At the output of the quadratic nonlinearity are frequency components at the double frequency of the input signal, but also at zero frequency. The frequency components at double the frequency are filtered away with an anti-aliasing filter of the ADC in the receive chain. The frequency components at zero frequency are referred to as IMD2 interference. IMD2 interference typically falls directly into the baseband signal.

For example, in a frequency division duplexing (FDD) transceiver in which the uplink channel is separate from downlink channel, a portion of the uplink signal (called "transmit leakage signal" or TxL signal) may leak through a duplexer and be injected into the receive chain. When the transmit leakage signal passes through a second order nonlinearity in the receive chain (which can be caused, e.g., by a coupling of the radio frequency (RF) and local oscillator (LO) port of a mixer) by-products which may cause noise, distortion, and IMD2 interference are generated. To the extent that the description herein is presented in the context of a mobile transceiver, the systems, methods, and devices described herein are equally applicable to any communication system, such as for example WiFi, that may or may not employ FDD.

Figure 1:
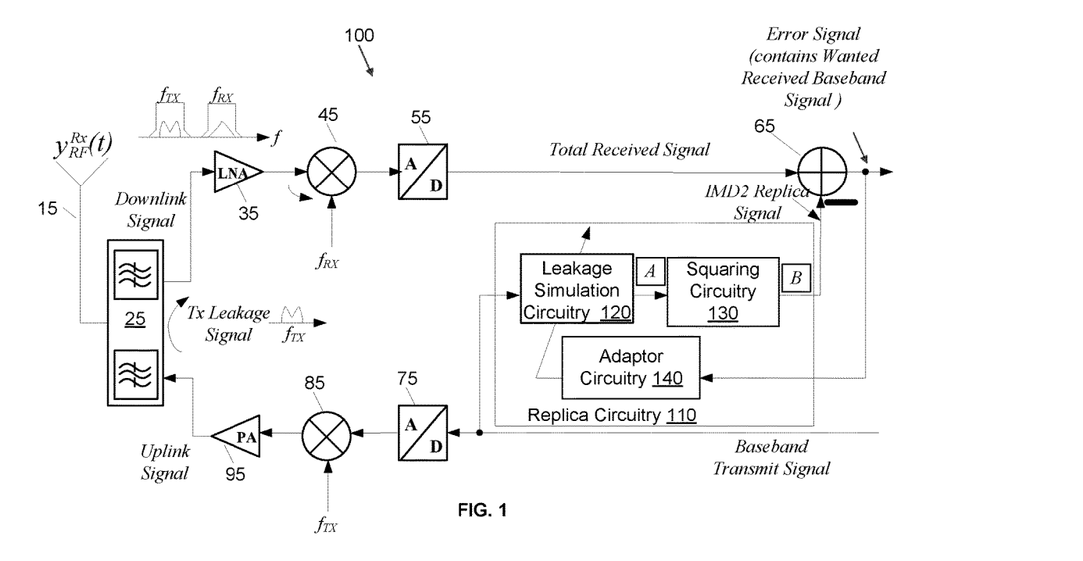
FIG. 1 illustrates an exemplary transceiver architecture in which replica circuitry generates a replica signal that is used to cancel second order intermodulation distortion from a receiver baseband signal.

FIG. 1 illustrates an exemplary radio frequency (RF) FDD or duplexer transceiver architecture 100 that includes replica circuitry 110 configured to cancel IMD2 distortion from the baseband signal in a receive chain. The transceiver 100 includes an antenna 15 that receives an RF signal in which the uplink signal and the downlink signal occur simultaneously in different channels. As shown in FIG. 1, a duplexer 25 includes two filters, one filter that filters out signal components from the downlink signal that are outside the receive channel and one filter that filters out signal components from the uplink signal that are outside the transmit channel.

A transmit chain includes a digital to analog converter (DAC) 75 that converts a digital baseband transmit signal to an analog signal having the baseband frequency. A mixer 85 upconverts the analog signal to an RF transmit signal with a local oscillator (LO) signal having a frequency approximately equal to a center frequency of the transmit channel ($f_{TX}$). A power amplifier (PA) 95 amplifies, with high gain, the RF transmit signal to generate the uplink signal that is transmitted, after filtering by the duplexer 25, by the antenna 15.

In the receive chain, a low noise amplifier (LNA) 35 amplifies, with high gain, the filtered downlink signal from the duplexer 25. A mixer 45 down-converts the amplified signal to baseband with an LO signal having a frequency approximately equal to a center frequency of the receive channel ($f_{RX}$). An analog-to-digital converter (ADC) 55 converts the downconverted signal to a digital "total received signal." After correction at summation circuitry 65, the total received signal becomes a "wanted received baseband signal" that is provided to decoding components (not shown) that extract the information encoded in the wanted received baseband signal. The "wanted received baseband signal" is embedded or contained in the "error signal" that is used to generate a corrective replica signal as described below. The receive chain may include other components that act on the output of the ADC 55 to generate the total received signal, as will be discussed with reference to FIGS. 2 and 3.

The IMD2 interference in RF transceivers is mostly generated by a coupling between a RF port and an LO port of the receiver mixer 45 like depicted in FIG. 1. But in general the second-order nonlinearity which generates the IMD2 interference can be anywhere in the receive chain (not only at the mixer 45) in front of the ADC 55. The coupling between the RF and LO ports results in a squaring and scaling operation of the RF TxL signal. The resulting nonlinear distortion includes two components. A first component is at double the transmit frequency and the second component, which is independent of the transmit-receive frequency offset (duplexing distance), is at a frequency within the receive baseband where it severely deteriorates the wanted received signal. The first component (i.e., at twice $f_{TX}$) is attenuated by an anti-aliasing filter (AAF) (not shown). The second IMD2 component, which falls in the receive baseband, has twice the transmit signal bandwidth. A channel-select filter (CSF)(see FIGS. 2 and 3) may be used in the receive chain to filter the second IMD2 component content outside the receive signal bandwidth.

The replica circuitry 110 generates an IMD2 replica signal (hereinafter "replica signal") that is subtracted from the total received signal (e.g., by summation circuitry 65) to cancel IMD2 distortion from the baseband received signal. Existing IMD2 cancelation techniques have either low complexity and moderate performance or very high complexity with good performance. However, as will be described in more detail below, the replica circuitry 110 generates the replica signal with the low complexity of traditional least mean square approaches while providing very high cancelation performance.

Disclosed herein are apparatus and methods that utilize replica circuitry to generate a replica signal that models expected IMD2 in the received signal. The disclosed replica circuitry and replica signal generation methods have relatively low complexity while providing high performance. This improves transceiver performance and allows for the use of duplexers with reduced transmit-receive isolation.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Still referring to FIG. 1, the replica circuitry 110 includes leakage simulation circuitry 120, squaring circuitry 130, and adaptor circuitry 140. The leakage simulation circuitry 120 is configured to estimate the transmit leakage signal based on the baseband transmit signal. The squaring circuitry 130 is configured to square an envelope of the estimated transmit leakage signal (A) to generate a squared envelope signal (B) that is used to generate the replica signal. In some examples, additional processing is performed on the squared envelope signal B to generate the replica signal, as will be discussed with reference to FIGS. 2 and 3. The adaptor circuitry 140 is configured to modify the operation of the leakage simulation circuitry 120 to reduce the error between the replica signal and the actual IMD2 in the total received signal.

Recall that the IMD2 distortion results in a scaling and squaring operation on the RF transmit leakage signal. By first estimating a baseband equivalent of the transmit leakage signal (hereinafter "estimated transmit leakage signal") with the leakage simulation circuitry 120 and then performing the squaring operation (e.g., with squaring circuitry 130) on the envelope of the estimated transmit leakage signal, the complexity of the estimation process is reduced. This is because the estimation process performed by the leakage simulation circuitry 120 models just the duplexer behavior rather than trying to model the overall receive chain behavior, which includes the squaring operation.

Figure 1A:
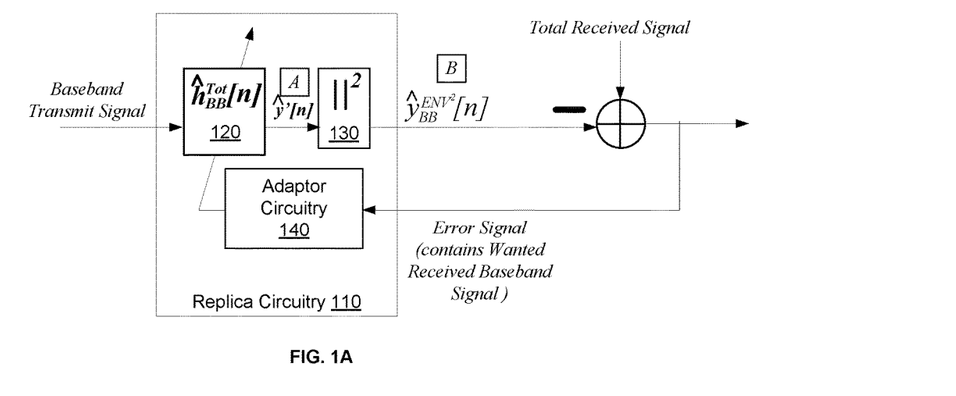
FIG. 1A illustrates an exemplary replica circuitry.

FIG. 1A illustrates an exemplary replica circuitry 110. The leakage simulation circuitry 120 is a digital finite impulse response (FIR) filter that filters the baseband transmit signal based on a plurality of coefficients. The leakage simulation circuitry 120 may also be modeled as an infinite impulse response (IIR) filter. The impulse response of the FIR filter, $\hat{h}_{BB}^{Tot}[n]$, is chosen to model the impulse response of the duplexer and thereby to estimate a portion of the uplink signal that leaks through the duplexer to the downlink signal. The amplitude or envelope of the estimated transmit leakage signal (A), which will designated herein as $\hat{y}'[n]$, is squared by the squaring circuitry 130 to generate the estimated squared envelope signal (B), designated as $\bar{y}_{BB}^{Env^2}[n]$. The estimated squared envelope signal is used to generate the replica signal that is subtracted from the total received signal. As will be described in more detail with reference to FIG. 2, the adaptor circuitry is configured to determine values for the plurality of coefficients in the FIR filter 120 based on previous values of the transmit signal and an error signal.

Figure 2:
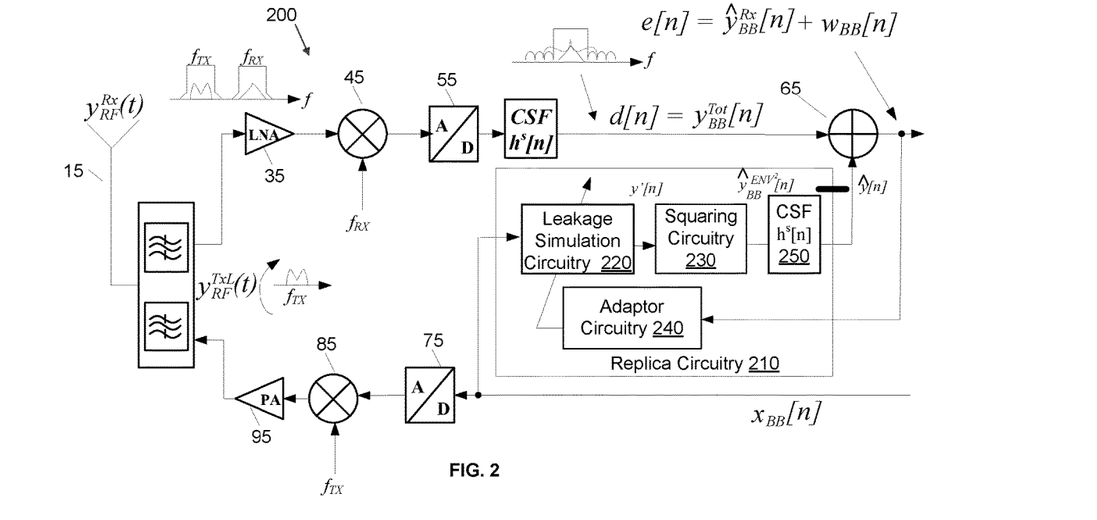
FIG. 2 illustrates another exemplary transceiver architecture in which replica circuitry generates a replica signal that is used to cancel second order intermodulation distortion from a receiver baseband signal.

FIG. 2 illustrates an example transceiver architecture 200 that includes replica circuitry 210 configured to model a CSF in the receive chain in addition to the response of the duplexer 25. The spectrum of the output of the receive mixer 45 is illustrated in FIG. 2 and includes the receive signal within the receive channel and also the IMD2 distortion (shown in dashed) having twice the bandwidth of the transmit signal and a significant DC component. The CSF in the receive chain is used to filter the IMD2 distortion outside the receive channel, but does not effectively remove the IMD2 distortion within the receive bandwidth. To compensate for the presence of the CSF in the receive chain, the replica circuitry 210 includes a CSF 250 that has the same transfer function as the CSF in the receive chain. The CSF 250 filters the squared envelope signal $\bar{y}_{BB}^{Env^2}[n]$ that is the result of squaring circuitry 230 squaring the envelope of the estimated transmit leakage $\hat{y}'[n]$ signal generated by leakage simulation circuitry 220.

Adaptor circuitry 240 determines values of coefficients in the FIR filter in the leakage simulation circuitry 220. A derivation of one example method or algorithm that may be used by the adaptor circuitry to determine the coefficient values will now be presented. Still referring to FIG. 2, the output of the leakage simulation circuitry 220 filter is:

$$\hat{y}'[n]=x_{BB}[n]^T \hat{h}_{BB}^{Tot}[n]=x^T \hat{h} \quad \text{EQ (1)}$$

where the vector $x_{BB}[n]$ contains the last M transmit signal samples and $\hat{h}_{BB}^{Tot}[n]$ is the estimated duplexer impulse response vector. The IMD2 interference replica is estimated by:

$$\hat{y}[n]=\hat{y}'\hat{y}'^*=\hat{h}^T x x^H \hat{h}^* * h^s[n] \quad \text{EQ (2)}$$

where $h^s[n]$ is the impulse response of the CSF in the receive chain. The error signal is the total received signal $d[n]$ minus the IMD2 replica signal generated by the replica circuitry 210:

$$e[n]=d[n]-\hat{y}[n] \quad \text{EQ (3)}$$

Figure 3:
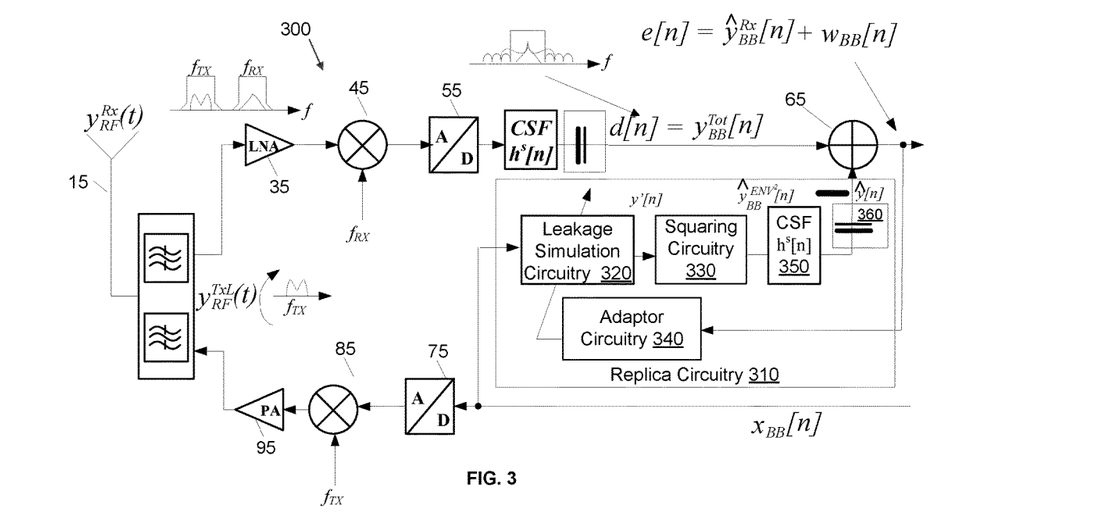
FIG. 3 illustrates another exemplary transceiver architecture in which replica circuitry generates a replica signal that is used to cancel second order intermodulation distortion from a receiver baseband signal.

Note that in FIGS. 2 and 3, $w_{bb}[n]$ is the thermal noise that is received with the antenna and also downconverted by the mixer into the baseband. Using the Mean-square-error criterion $$\hat{h}_{opt} = \underset{\hat{h}}{\mathrm{argmin}}\{E\{e[n]e[n]^*\}\} \quad \text{EQ (4)}$$

the instantaneous cost function to minimize is:

$$\begin{aligned} J(\hat{h}) &= |e|^2 \\ &= ee^* \\ &= (d[n]-\hat{y}[n])(d[n]-\hat{y}[n])^* \\ &= dd^* - d\hat{h}^* - d^*\hat{h} + \hat{y}\hat{y}^* \\ &= dd^* - dx^H \hat{h}^* x^T \hat{h} - d^* x^T \hat{h} x^H \hat{h}^* + x^T \hat{h} x^H \hat{h}^* x^T \hat{h} \\ &= dd^* - d\hat{h}^T x x^H \hat{h}^* - d^* \hat{h}^* x x^H \hat{h}^* + \left(\hat{h}^T x x^H \hat{h}^*\right)^2 \end{aligned} \quad \text{EQ (5)}$$

The gradient of the cost function of Equation 5 is used by the adaptor circuitry 240 to iteratively update the coefficients of the leakage simulation circuitry 230 by:

$$\begin{aligned} \nabla_{\hat{h}} J(\hat{h}, \hat{h}^*) &= \left(\frac{\partial J}{\partial \hat{h}^*}\right)^T \\ &= \left(-d\hat{h}^T x^H - d^* \hat{h}^T x x^H + 2(\hat{h}^T x x^H \hat{h}^*)\hat{h}^T x x^B\right)^T \\ &= -dy'x^* - d^* y'x^* + 2(y'y'^*)y'x^* \\ &= (-d - d^* + 2y'y'^*)y'x^* \\ &= -(d + d^* - 2\hat{y})y'x^* \\ &= [(d - \hat{y}) + (d^* - \hat{y}^*)]y'x^* \\ &= -(e + e^*)y'x^*, \end{aligned} \quad \text{EQ (6)}$$

The final LMS coefficient update equation used by the adaptor circuitry 240 is:

$$\begin{aligned} \hat{h}[n+1] &= \hat{h}[n] - \mu \nabla_{\hat{h}} J \\ &= \hat{h}[n] + \mu(e[n] + e[n]^*)y'[n]x[n]^* \end{aligned} \quad \text{EQ (7)}$$

where $\mu$ is the step size used by the adaptor circuitry 240 in each iteration. With the IMD2 interference regeneration given by:

$$y'[n]=x[n]^T\hat{h}[n] \quad \text{EQ (8)}$$

the replica signal is:

$$\hat{y}[n]=\hat{y}'\hat{y}'^**h^s[n] \quad \text{EQ (9)}$$

Due to the quadratic nature of the cost function, and consequently a fourth order dependency of the unknown coefficients, the cost function Equation 5 has a local maximum at the origin where all coefficients are zero. This is seen in the complex valued hessian matrix of the cost function $$H_c = \frac{\partial^2 J}{\partial \hat{h}*\partial \hat{h}} = -\left(d + d^* - \hat{h}^T x x^H \hat{h}^*\right)xx^H \quad \text{EQ (10)}$$

which is negative semi-definite at the point $\hat{h}_0=0$ $$H_c = \frac{\partial^2 J}{\partial \hat{h}*\partial \hat{h}}\bigg|_{\hat{h}_0=0} = -(d+d^*)xx^H \le 0. \quad \text{EQ (11)}$$

When using the zero-vector as initialization of the coefficient vector $\hat{h}_0$, then the gradient in Equation 6 is also zero because $\hat{y}'[n]$ is zero, and therefore the gradient stays zero because the cost function of Equation 5 has a local maximum at the origin. Consequently a zero-initialization is not used by the adaptor circuitry 240. But any other initialization may be used. For example, $\hat{h}_0 = [1e-\vartheta, 0, 0, \ldots, 0]$ is a valid initialization. In one example the adaptor circuitry 240 initializes at least one of the coefficients in the leakage simulation circuitry 220 to a non-zero value.

The cost function of Equation 5 has at least two global minimum points, but no local minimum, because of the absolute squaring operation. For example if the real duplexer impulse response is $h=[h0, h1]^T$ with $h0=1$, $h1=0.5$, and two real valued coefficients are used by the leakage simulation circuitry 220, both global minima $h0_{opt1}=1$, $h1_{opt1}=0.5$ and $h0_{opt2}=-1$, $h1_{opt2}=-0.5$ solutions are on the radius $h0^2+h1^2=1.25$. In which global minimum the adaptive algorithm converges depends on the initialization of the coefficient vector $\hat{h}_0$. This means, no matter to which optimum point the adaptor circuitry 240 converges by using the described LMS, the IMD2 interference is properly represented by the replica signal. Different coefficients can result in the same IMD2 replica, which is due to the absolute-squaring operation which creates the IMD2 interference. With the absolute-squaring operation (e.g., by squaring circuitry 230) of the complex valued TxL signal (in the baseband equivalent IMD2 interference model), the phase information is lost and cannot be estimated anymore because the problem is reduced by one dimension. However, the adaptor circuitry 240 will converge into one of the global minimum points and recreate the IMD2 interference correctly.

The coefficient update Equation 7 is not normalized and therefore the convergence behavior is dependent on the input signal power of the training sequence $x_{BB}[n]$. To overcome this issue, a normalization operation may be performed by the adaptor circuitry 240 based on the relationship between the a priori and a posteriori error.

The final regularized and normalized IMD2 cancelation LMS algorithm is:

$$\hat{h}[n+1] = \hat{h}[n] + \frac{\mu_0(e[n]+e[n]^*)y'[n]x[n]^*}{\epsilon + |y'[n]|^2 x[n]^H x[n]} \quad \text{EQ (12)}$$

$$y'[n] = x[n]^T \hat{h}[n]$$

$$\hat{y}[n] = \hat{y}'\hat{y}'^* * h^s[n]$$

where $\epsilon$ is a regularization term and $\mu$ the step-size of the adaptive algorithm. Using the normalized coefficient update of Equation 12 greatly improves stability for a step size $0<\mu<1$, resulting in faster convergence.

Thus, it can be seen from the above explanation that the adaptor circuitry 240 may be configured to determine the values for the plurality of coefficients by minimizing a cost function that is a fourth order function of the plurality of coefficients and includes at least two global minimums. The adaptor circuitry 240 may be configured to determine the values for the plurality of coefficients by adjusting a present value of each of the plurality of coefficients based on a gradient of the cost function at the present value. The adaptor circuitry 240 may be configured to initialize at least one coefficient value of the plurality of coefficients to a non-zero value when performing an initial determination of the plurality of coefficient values.

FIG. 3 illustrates an example transceiver architecture 300 in which the receiver chain includes a high pass filter (designate by a capacitor symbol). When the high pass filter is used, replica circuitry 310 also includes a corresponding high pass filter 360. In this case the coefficient update performed by adaptor circuitry 340 is extended by a DC notch filter. The DC notch filter is a high pass filter which is implemented as a discrete time difference equation within the coefficient update method.

When the high pass filter is used it may be beneficial to use a variable step size $\mu$ or $\mu0$ in the coefficient update operation:

$$\hat{h}[n+1] = \hat{h}[n] - \mu \nabla_{\hat{h}} J \quad \text{EQ (13)}$$

$$= \hat{h}[n] + \mu(e[n]+e[n]^*)y'[n]x[n]^*$$

or $$\hat{h}[n+1] = \hat{h}[n] + \frac{\mu_0(e[n]+e[n]^*)y'[n]x[n]^*}{\epsilon + |y'[n]|^2 + x[n]^H x[n]}. \quad \text{EQ (14)}$$

In the case of equation 14 the step size is large at the beginning of the update iterations and gets smaller with an increased number of updates.

For example, the following equation may be used to determine the step size:

$$\mu[n] = \frac{\mu_0}{\alpha \cdot n + \beta} + \mu_{min} \quad \text{EQ (15)}$$

where $\mu_0$ is the starting step size and $\mu_{min}$ is the minimum step size with $\mu_0<1$ and $\mu_{min}>0$. The factors $\alpha$ and $\beta$ are used to adjust how fast the step size decreases from the initial step size $\mu_0$ to $\mu_{min}$. The parameter $\beta$ may be set to $\beta=1$ and n is the current iteration number.

It can be seen from the above description that the complexity of the estimation process performed by the leakage estimation circuitry 120, 220, or 320 is on the order of M, where M is the number of coefficients. This is the case even though the IMD2 distortion includes a squaring function of the transmit leakage signal.

Figure 4:
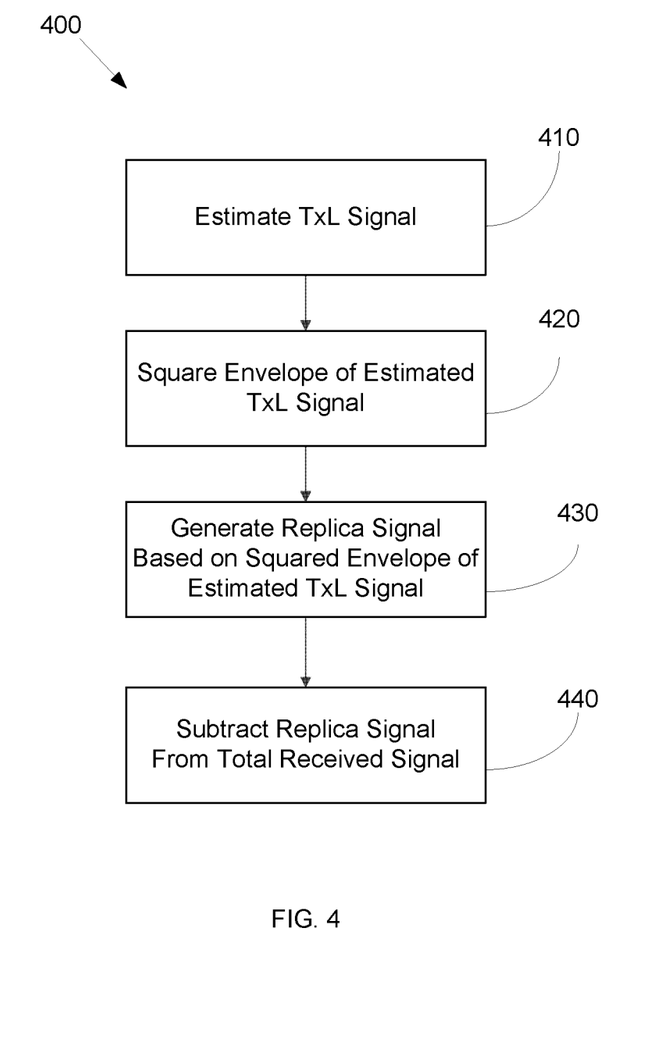
FIG. 4 illustrates a flowchart that outlines an exemplary method for canceling second order intermodulation distortion from a receiver baseband signal.

FIG. 4 depicts a flowchart outlining one embodiment of a method 400 for canceling intermodulation distortion from a receiver baseband signal. The method 400 may be performed, for example, by the replica circuitry 110, 210, or 310 of FIGS. 1-3. At 410 the method includes estimating a baseband equivalent transmit leakage signal for a duplexer, where the duplexer is included in a transceiver that includes a transmit chain and a receive chain. An envelope of the estimated transmit leakage signal is squared at 420. At 430 a replica signal is generated based at least on the squared envelope of the estimated transmit leakage signal estimated transmit leakage signal. The method includes, at 440, subtracting the replica signal from a total received signal in the receive chain to generate a wanted received baseband signal.

It can be seen from the foregoing description that the disclosed second order intermodulation distortion cancelation methods and circuitries provides low complexity distortion cancelation.

Figure 5:
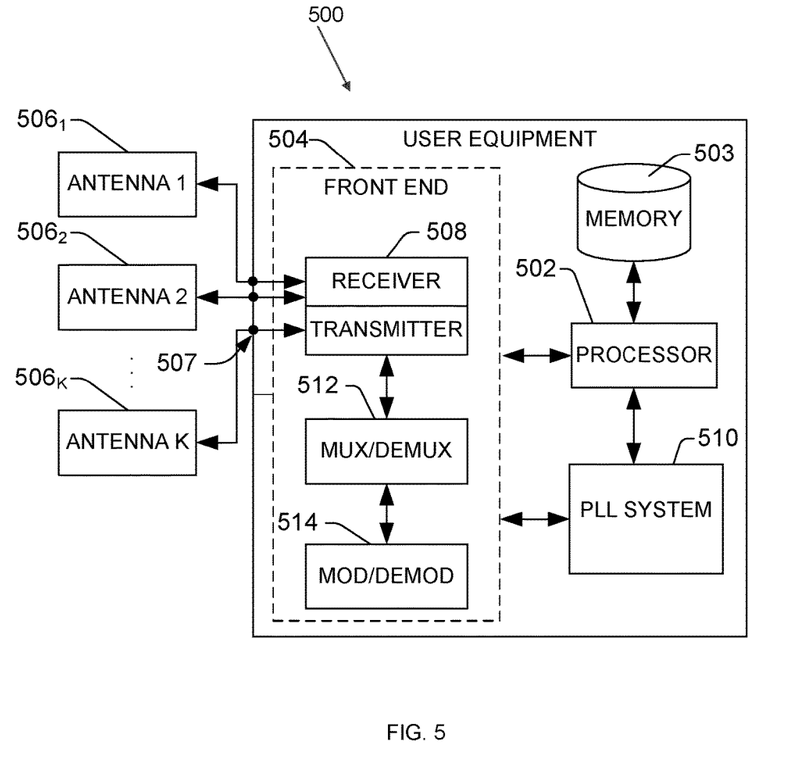
FIG. 5 illustrates an exemplary user equipment device that includes a transmitter front end that includes replica circuitry in accordance with various aspects described.

To provide further context for various aspects of the disclosed subject matter, FIG. 5 illustrates a block diagram of an embodiment of user equipment 500 (e.g., a mobile device, communication device, personal digital assistant, etc.) related to access of a network (e.g., base station, wireless access point, femtocell access point, and so forth) that can enable and/or exploit features or aspects of the disclosed aspects.

The user equipment or mobile communication device 500 can be utilized with one or more aspects of the replica circuitry described herein according to various aspects. The user equipment device 500, for example, comprises a digital baseband processor 502 that can be coupled to a data store or memory 503, a front end 504 (e.g., an RF front end, an acoustic front end, or the other like front end) and a plurality of antenna ports 507 for connecting to a plurality of antennas 5061 to 506*k* (k being a positive integer). The antennas 5061 to 506*k* can receive and transmit signals to and from one or more wireless devices such as access points, access terminals, wireless ports, routers and so forth, which can operate within a radio access network or other communication network generated via a network device (not shown).

The user equipment 500 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 504 can include a communication platform, which comprises electronic components and associated circuitry that provide for processing, manipulation or shaping of the received or transmitted signals via one or more receivers or transmitters (e.g. transceivers) 508, a mux/demux component 512, and a mod/demod component 514. The front end 504 is coupled to the digital baseband processor 502 and the set of antenna ports 507, in which the set of antennas 5061 to 506*k* can be part of the front end. In one aspect, the user equipment device 500 can comprise a phase locked loop system 510.

The processor 502 can confer functionality, at least in part, to substantially any electronic component within the mobile communication device 500, in accordance with aspects of the disclosure. As an example, the processor 500 can be configured to execute, at least in part, executable instructions that compute the coefficients of the replica circuitry of FIGS. 1-3. The processor 500 may embody various aspects of the leakage simulation circuitry, adaptor circuitry, squaring circuitry, and so on, of FIGS. 1-3 as a multi-mode operation chipset that affords intermodulation distortion cancelation in a receiver.

The processor 502 is functionally and/or communicatively coupled (e.g., through a memory bus) to memory 503 in order to store or retrieve information necessary to operate and confer functionality, at least in part, to communication platform or front end 504, the phase locked loop system 510 and substantially any other operational aspects of the phase locked loop system 510. The phase locked loop system 510 includes at least one oscillator (e.g., a VCO, DCO or the like) that can be calibrated via core voltage, a coarse tuning value, signal, word or selection process according the various aspects described herein.

The processor 502 can operate to enable the mobile communication device 500 to process data (e.g., symbols, bits, or chips) for multiplexing/demultiplexing with the mux/demux component 512, or modulation/demodulation via the mod/demod component 514, such as implementing direct and inverse fast Fourier transforms, selection of modulation rates, selection of data packet formats, inter-packet times, etc. Memory 503 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a transceiver that includes a transmit chain, a replica circuitry, and a receive chain. The transmit chain is configured to process a baseband transmit signal to generate an uplink signal having a transmit frequency in a first channel. The replica circuitry is configured to generate a replica signal. The replica circuitry includes a leakage simulation circuitry configured to estimate a transmit leakage signal and a squaring circuitry configured to square an envelope of the estimated transmit leakage signal. The replica signal is based at least on the squared envelope of the estimated transmit leakage signal. The receive chain is configured to process a downlink signal having a receive frequency in a second channel and to subtract the replica signal from a total received signal to generate a wanted received baseband signal.

Example 2 includes the subject matter of claim 1, including or omitting optional elements, further including a duplexer configured to filter the downlink signal to remove signal components outside the second channel.

Example 3 includes the subject matter of claim 2, including or omitting optional elements, wherein the replica circuitry further comprises a channel select filter configured to filter the squared envelope of the estimated transmit leakage signal to remove signal components outside the second channel.

Example 4 includes the subject matter of claims 2-3, including or omitting optional elements, wherein the leakage simulation circuitry is configured to filter the baseband transmit signal based on a plurality of coefficients, further wherein the replica circuitry comprises an adaptor circuitry configured to determine values for the plurality of coefficients to estimate a portion of the uplink signal that leaks through the duplexer to the downlink signal.

Example 5 includes the subject matter of claim 4, including or omitting optional elements, wherein the adaptor circuitry is configured to determine the values for the plurality of coefficients by minimizing a cost function that is a fourth order function of the plurality of coefficients and includes at least two global minimums.

Example 6 includes the subject matter of claim 5, including or omitting optional elements, wherein the adaptor circuitry is configured to determine the values for the plurality of coefficients by adjusting a present value of each of the plurality of coefficients based on a gradient of the cost function at the present value.

Example 7 includes the subject matter of claim 5, including or omitting optional elements, wherein the adaptor circuitry is configured to initialize at least one coefficient value of the plurality of coefficients to a non-zero value when performing an initial determination of the plurality of coefficient values.

Example 8 includes the subject matter of claim 3, including or omitting optional elements, wherein the replica circuitry further comprises a high pass filter configured to filter an output of the channel select filter.

Example 9 includes the subject matter of claim 8, including or omitting optional elements, wherein the leakage simulation circuitry is configured to filter the baseband transmit signal based on a plurality of coefficients and the replica circuitry includes an adaptor circuitry configured to use iterations of coefficient values by a step size to determine values for the plurality of coefficients to estimate a portion of the uplink signal that leaks through the duplexer to the downlink signal. A larger step size is used for an initial iteration and a smaller step size is used with an increased number of iterations.

Example 10 is a method that includes estimating a transmit leakage signal for a duplexer, where the duplexer is included in a transceiver that includes a transmit chain and a receive chain; squaring an envelope of the estimated transmit leakage signal; generating a replica signal based at least on the squared envelope of the estimated transmit leakage signal estimated transmit leakage signal; and subtracting the replica signal from a total received signal in the receive chain to generate a wanted received baseband signal.

Example 11 includes the subject matter of claim 10, including or omitting optional elements, including filtering, with a channel select filter, the squared envelope of the estimated transmit leakage signal to remove signal components outside a receive channel of the transceiver.

Example 12 includes the subject matter of claims 10-11, including or omitting optional elements, wherein the estimating comprises filtering a baseband transmit signal based on a plurality of coefficients, further including determining values for the plurality of coefficients to estimate a portion of an uplink signal that leaks through a duplexer to a downlink signal.

Example 13 includes the subject matter of claim 12, including or omitting optional elements, further including determining the values for the plurality of coefficients by minimizing a cost function that is a fourth order function of the plurality of coefficients and includes at least two global minimums.

Example 14 includes the subject matter of claim 13, including or omitting optional elements, further including determining the values for the plurality of coefficients by adjusting a present value of each of the plurality of coefficients based on a gradient of the cost function at the present value.

Example 15 includes the subject matter of claim 13, including or omitting optional elements, further including initializing at least one coefficient value of the plurality of coefficients to a non-zero value when performing an initial determination of the plurality of coefficient values.

Example 16 includes the subject matter of claim 11, including or omitting optional elements, further including filtering, with a high pass filter, an output of the channel select filter.

Example 17 is a replica circuitry that includes leakage estimation circuitry and squaring circuitry. The leakage estimation circuitry is configured to estimate a transmit leakage signal for a duplexer, where the duplexer is included in a transceiver that includes a transmit chain and a receive chain. The squaring circuitry is configured to square an envelope of the estimated transmit leakage signal. The replica circuitry is configured to generate a replica signal based at least on the squared envelope of the estimated transmit leakage signal and subtract the replica signal from a total received signal in the receive chain to generate a wanted received baseband signal.

Example 18 includes the subject matter of claim 17, including or omitting optional elements, further including a channel select filter configured to filter the squared envelope of the estimated transmit leakage signal to remove signal components outside a receive channel of the transceiver.

Example 19 includes the subject matter of claims 17-18, including or omitting optional elements, wherein the leakage estimation circuitry is configured to estimate the transmit leakage signal by filtering a baseband transmit signal based on a plurality of coefficients, further wherein the replica circuitry includes adaptor circuitry configured to determine values for the plurality of coefficients to estimate a portion of an uplink signal that leaks through the duplexer to a downlink signal.

Example 20 includes the subject matter of claim 19, including or omitting optional elements, wherein the adaptor circuitry is configured to determine the values for the plurality of coefficients by minimizing a cost function that is a fourth order function of the plurality of coefficients and includes at least two global minimums.

Example 21 includes the subject matter of claim 19, including or omitting optional elements, wherein the adaptor circuitry is configured to determine the values for the plurality of coefficients by adjusting a present value of each of the plurality of coefficients based on a gradient of the cost function at the present value.

Example 22 includes the subject matter of claim 19, including or omitting optional elements, wherein the adaptor circuitry is configured to initialize at least one coefficient value of the plurality of coefficients to a non-zero value when performing an initial determination of the plurality of coefficient values.

Example 23 includes the subject matter of claim 18, including or omitting optional elements, further including a high pass filter configured to filter an output of the channel select filter.

Example 24 is an apparatus that includes means for estimating a transmit leakage signal for a duplexer, where the duplexer is included in a transceiver that includes a transmit chain and a receive chain. The apparatus includes means for squaring an envelope of the estimated transmit leakage signal. The apparatus includes means for generating a replica signal based at least on the squared envelope of the estimated transmit leakage signal. The apparatus includes means for subtracting the replica signal from a total received signal in the receive chain to generate a wanted received baseband signal.

Example 25 includes the subject matter of example 24, including or omitting optional elements, wherein the means for estimating includes means for filtering a baseband transmit signal based on a plurality of coefficients and means for determining values for the plurality of coefficients to estimate a portion of an uplink signal that leaks through the duplexer to a downlink signal.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. A transceiver, comprising:
a transmit chain configured to process a baseband transmit signal to generate an uplink signal having a transmit frequency in a first channel;
a receive chain configured to process a downlink signal having a receive frequency in a second channel;
a duplexer configured to filter the downlink signal to remove signal components outside the second channel
a replica circuitry configured to generate a replica signal, the replica circuitry comprising:
a leakage simulation circuitry configured to generate an estimated transmit leakage signal by filtering the baseband transmit signal based on a plurality of coefficients;
an adaptor circuitry configured to determine values for the plurality of coefficients to estimate a portion of the uplink signal that leaks through the duplexer to the downlink signal,
wherein the adaptor circuitry is configured to determine the values using iterations of coefficient values by a step size; and
a squaring circuitry configured to square an envelope of the estimated transmit leakage signal,
wherein the replica signal is based at least on the squared envelope of the estimated transmit leakage signal;
wherein the receive chain is configured to subtract the replica signal from a total received signal to generate a wanted received baseband signal.

2. The transceiver of claim 1, wherein the replica circuitry further comprises a channel select filter configured to filter the squared envelope of the estimated transmit leakage signal to remove signal components outside the second channel.

3. The transceiver of claim 1, wherein the adaptor circuitry is configured to determine the values for the plurality of coefficients by minimizing a cost function that is a fourth order function of the plurality of coefficients and includes at least two global minimums.

4. The transceiver of claim 3, wherein the adaptor circuitry is configured to determine the values for the plurality of coefficients by adjusting a present value of each of the plurality of coefficients based on a gradient of the cost function at the present value.

5. The transceiver of claim 1, wherein the adaptor circuitry is configured to initialize at least one coefficient value of the plurality of coefficients to a non-zero value when performing an initial determination of the plurality of coefficient values.

6. The transceiver of claim 2, wherein the replica circuitry further comprises a high pass filter configured to filter an output of the channel select filter.

7. The transceiver of claim 1, wherein a larger step size is used for an initial iteration and a smaller step size is used with an increased number of iterations.

8. A method, comprising:
determining values for a plurality of filter coefficients to estimate a portion of an uplink signal that leaks through a duplexer to a downlink signal, wherein the determining is performed using iterations of coefficient values by a step size, further wherein the duplexer is included in a transceiver that includes a transmit chain and a receive chain;
filtering a baseband transmit signal based on the plurality of filter coefficients to generate an estimated transmit leakage signal for the duplexer;
squaring an envelope of the estimated transmit leakage signal;
generating a replica signal based at least on the squared envelope of the estimated transmit leakage signal; and
subtracting the replica signal from a total received signal in the receive chain to generate a wanted received baseband signal.

9. The method of claim 8, further comprising filtering, with a channel select filter, the squared envelope of the estimated transmit leakage signal to remove signal components outside a receive channel of the transceiver.

10. The method of claim 8, further comprising determining the values for the plurality of coefficients by minimizing a cost function that is a fourth order function of the plurality of coefficients and includes at least two global minimums.

11. The method of claim 10, further comprising determining the values for the plurality of coefficients by adjusting a present value of each of the plurality of coefficients based on a gradient of the cost function at the present value.

12. The method of claim 10, further comprising initializing at least one coefficient value of the plurality of coefficients to a non-zero value when performing an initial determination of the plurality of coefficient values.

13. The method of claim 9, further comprising filtering, with a high pass filter, an output of the channel select filter.

14. A replica circuitry, comprising:
leakage simulation circuitry configured to generate an estimated transmit leakage signal for a duplexer by filtering the baseband transmit signal based on a plurality of coefficients,
where the duplexer is included in a transceiver that includes a transmit chain and a receive chain;
an adaptor circuitry configured to determine values for the plurality of coefficients to estimate a portion of an uplink signal that leaks through the duplexer to a downlink signal,
wherein the adaptor circuitry is configured to determine the values using iterations of coefficient values by a step size; and
squaring circuitry configured to square an envelope of the estimated transmit leakage signal;
wherein the replica circuitry is configured to:
generate a replica signal based at least on the squared envelope of the estimated transmit leakage signal; and
subtract the replica signal from a total received signal in the receive chain to generate a wanted received baseband signal.

15. The replica circuitry of claim 14, further comprising a channel select filter configured to filter the squared envelope of the estimated transmit leakage signal to remove signal components outside a receive channel of the transceiver.

16. The replica circuitry of claim 14, wherein the adaptor circuitry is configured to determine the values for the plurality of coefficients by minimizing a cost function that is a fourth order function of the plurality of coefficients and includes at least two global minimums.

17. The replica circuitry of claim 16, wherein the adaptor circuitry is configured to determine the values for the plurality of coefficients by adjusting a present value of each of the plurality of coefficients based on a gradient of the cost function at the present value.

18. The replica circuitry of claim 14, wherein the adaptor circuitry is configured to initialize at least one coefficient value of the plurality of coefficients to a non-zero value when performing an initial determination of the plurality of coefficient values.

19. The replica circuitry of claim 15, further comprising a high pass filter configured to filter an output of the channel select filter.

* * * * *